(12) United States Patent
Komissarchik et al.

(10) Patent No.: US 7,774,754 B2
(45) Date of Patent: Aug. 10, 2010

(54) SYSTEM AND METHOD FOR SOFTWARE APPLICATION DEVELOPMENT USING VIRTUAL PATH MAPPING

(75) Inventors: Konstantin Komissarchik, Woodinville, WA (US); Robert Woollen, San Francisco, CA (US); Theodore Bashor, Seattle, WA (US)

(73) Assignee: BEA Systems, Inc., Redwood Shores, CA (US)

( * ) Notice: Subject to any disclaimer, the term of this patent is extended or adjusted under 35 U.S.C. 154(b) by 1068 days.

(21) Appl. No.: 11/475,769

(22) Filed: Jun. 27, 2006

(65) Prior Publication Data

US 2007/0038976 A1 Feb. 15, 2007

Related U.S. Application Data

(63) Continuation-in-part of application No. 10/786,748, filed on Feb. 25, 2004, now Pat. No. 7,506,308.

(60) Provisional application No. 60/740,797, filed on Nov. 30, 2005.

(51) Int. Cl.
*G06F 9/44* (2006.01)
(52) U.S. Cl. .................................. 717/120; 717/175
(58) Field of Classification Search ....................... None
See application file for complete search history.

(56) References Cited

U.S. PATENT DOCUMENTS

| | | | |
|---|---|---|---|
| 5,812,849 A | 9/1998 | Nykiel et al. | |
| 5,999,741 A | 12/1999 | May et al. | |
| 6,003,042 A | 12/1999 | Melahn | |
| 6,023,271 A | 2/2000 | Quaeler-Bock et al. | |
| 6,064,382 A | 5/2000 | Diedrich et al. | |
| 6,112,024 A | 8/2000 | Almond et al. | |
| 6,202,207 B1 | 3/2001 | Donohue | |
| 6,301,590 B1 | 10/2001 | Siow et al. | |
| 6,473,894 B1 | 10/2002 | Shrader et al. | |
| 6,779,177 B1 | 8/2004 | Bahrs et al. | |
| 6,892,382 B1 | 5/2005 | Hapner et al. | |
| 6,986,135 B2 | 1/2006 | Leathers et al. | |
| 7,246,352 B2* | 7/2007 | Jain et al. | 717/176 |
| 7,412,700 B2* | 8/2008 | Lari et al. | 717/175 |
| 7,503,034 B2* | 3/2009 | Berg et al. | 717/120 |
| 2003/0101245 A1 | 5/2003 | Srinivasan et al. | |
| 2007/0006152 A1* | 1/2007 | Ahmed et al. | 717/122 |

OTHER PUBLICATIONS

Singh, Inderjeet et al., "Designing Enterprise Applications with the J2EE(TM) Platform, Second Edition," 2002, pp. 201-250.*

* cited by examiner

*Primary Examiner*—Michael J Yigdall
(74) *Attorney, Agent, or Firm*—Fliesler Meyer LLP

(57) ABSTRACT

A development-oriented split-source directory structure, that can be used with an application server and which solves a number of the problems associated with traditional Enterprise Archive (EAR) files. In particular, the split-source directory structure presents a clean separation between human-readable source files stored in a source control system and generated java class files. The two directories (source and output) appear like a single application. In addition, the split-source directory structure supports an abstraction layer and mappings that allow a physical file location to be mapped to a virtual location. In this manner, the system provides flexibility in how the build structure can be laid out for a particular application development.

18 Claims, 2 Drawing Sheets

SYSTEM AND METHOD FOR SOFTWARE APPLICATION DEVELOPMENT USING VIRTUAL PATH MAPPING

CLAIM OF PRIORITY

This application is a continuation-in-part of U.S. Patent Application "SYSTEM AND METHOD FOR USING A SPLIT-DIRECTORY STRUCTURE FOR SOFTWARE DEVELOPMENT", application Ser. No. 10/786,748, filed Feb. 25, 2004. This application also claims the benefit of U.S. Provisional Patent Application No. "SYSTEM AND METHOD FOR SOFTWARE APPLICATION DEVELOPMENT USING VIRTUAL PATH MAPPING", Application No. 60/740,797, filed Nov. 30, 2005; both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to software development, and particularly to a split-directory structure for software development, wherein the split-source directory structure also supports an abstraction layer that allows a physical file location to be mapped to a virtual location.

BACKGROUND

The J2EE specification defines the Enterprise Archive (EAR) file as a standard structure for developing and packaging J2EE applications. EARs are useful for application development, in that the application may, for example, include both a Web application (Webapp) and an Enterprise Java Bean (EJB), which will be packaged into the EAR. However, while this works well for completed applications, it isn't very convenient for application development.

In a typical application server development environment that uses EARs, a build structure similar to that shown in FIG. 1 is often used. As shown in FIG. 1, the directories for the /myapp application 10 include, for example, a /myejb subdirectory 12, for storing both ejb source files and XML descriptors 16. Similarly /myapp may include a /webapp directory 14, for storing JSPs, html files, and images 18, etc. All of this code is stored in the developer's source control system for use by the developer in building the application.

To deploy the application, a number of steps must be performed, namely compiling the Java files, generating any servlets or container classes, and packaging the whole lot in an EAR. The EAR adheres to a format wherein the top level includes an EAR descriptor/META-INF/application.xml, and all of the other components are listed underneath. This approach works well when the application has been fully completed and ready for installation in the production environment. However it's less useful for application development.

A problem with the traditional approach is that the developer will usually have both the source files and system-generated output in the same directory, which can be confusing.

It is also difficult to generate a clean build of the application since it is difficult to delete only the system-generated files.

In addition, it is desirable to provide a flexible means by which the actual build structure can be laid out. For example, in a traditional system the build structure must usually mirror the corresponding EAR structure. However, in some instances the developer may wish to use a different build structure. A mechanism that allows application development while maintaining some separation between the user-coded and system-generated files, together with providing flexibility in how the build structure can be laid out, would be useful in addressing these problems.

SUMMARY

An embodiment of the invention provides a development-oriented split-source directory structure, that can be used with an application server and which solves a number of the problems associated with traditional Enterprise Archive (EAR) files. In particular, the split-source directory structure avoids the copying of files during the build process, and presents a clean separation between human-readable source files stored in a source control system and generated java class files. The two directories (source and output) appear like a single application. In addition, the split-source directory structure supports an abstraction layer and mappings that allow a physical file location to be mapped to a virtual location. In this manner, the system provides flexibility in how the build structure can be laid out for a particular application development.

DETAILED DESCRIPTION

An embodiment of the invention provides a development-oriented split-source directory structure, that can be used with an application server (for example the WebLogic Server from BEA Systems, Inc.), and which solves a number of the problems associated with traditional Enterprise Archive (EAR) files. In particular, the split-source directory structure avoids the copying of files during the build process, and presents a clean separation between human-readable source files stored in a source control system and generated java class files. The two directories (source and output) appear like a single application. In addition, the split-source directory structure supports mappings that allow a physical file location to be mapped to a virtual location. In this manner, the system provides flexibility in how the build structure can be laid out for a particular application development.

In a traditional software development system, use is made of a separate source directory (/source) for storing source code, typically under management or control of a source control system, and a build directory (/build) into which Java files, etc, are compiled. Each time a change is made to a small portion of the code, it's necessary to do a full redeployment. The server receiving the build only sees the /build directory, and not the /source directory. Besides being inelegant, this approach prevents the use of Web-editing-in-place of the source code so as to immediately see the effect of changes to the underlying source.

The solution provided by an embodiment of the invention is to provide a split-directory structure, and modify the server so that it can see both the /source and the /build directories. In addition, an abstraction layer and mappings allow a physical file location to be mapped to a virtual location.

Figure 1:
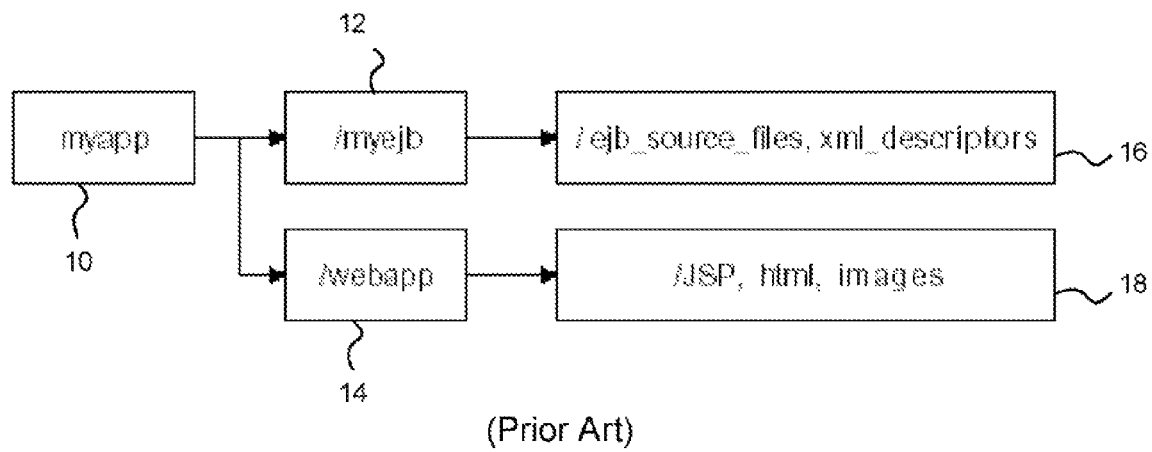
FIG. 1 shows an illustration of a directory structure used to store files for building an application.
Figure 2:
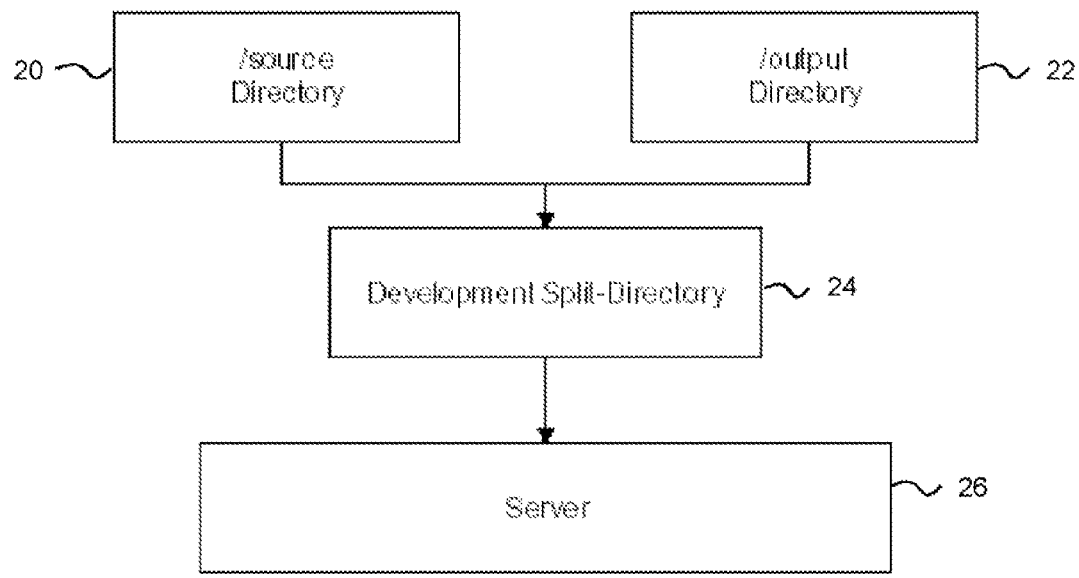
FIG. 2 shows an illustration of a split-source directory structure in accordance with an embodiment of the invention.

FIG. 2 illustrates an example of a development split-directory structure in accordance with an embodiment of the invention, as it may be interpreted by a server. As shown in FIG. 2, the /source 20 and /output 22 directories are interpreted as a single directory 24. This approach requires no copying, in that the server 26 can read source files (e.g. JSP's, XML descriptors, html images, etc.) directly from the split directory structure, without having to copy them to a /build directory. Everything that is generated goes into an /output directory. The benefit to this approach is that, since the server looks at both the directories, the developer can change the source files and the server will see the updates.

Implementation Detail

The split-directory system provides a recommended directory layout and an accompanying set of ant tasks for building and deploying applications. The split-directory differs from traditional EAR files because it is optimized for iterative development. Instead of a single archived EAR file or an "exploded" EAR directory structure, the split-directory has 2 parallel directories. The source directory contains all of the source files e.g. java files, descriptors, JSP files, HTML etc in a traditional EAR-like directory structure. All generated or compiled classes are stored in a separate output directory. This arrangement produces several advantages over the traditional exploded EAR file:

1. No need for file copying.

2. Web files can be changed and redeployed in place without rebuilding.

3. Clean separation between source and generated files allows cleaning the build by just removing the output directory.

Server Support for Split-Directory

The user specifies the output directory when deploying the application to the server. The server automatically recognizes the deployment as a split-directory and uses information in the output directory to locate the source directory. The Server views the application as a union of the source and output directories. When the server searches for a resource or class, it first checks the source directory. If the class or resource is not found, it then checks the output directory.

When the application is finally deployed, the split-directory appears just as it did using traditional source control. In accordance with one embodiment, the output directory includes a file (build.txt, or in some instances referred to as .beabuild.txt) the content of which indicates that the output directory is in fact an output directory of a corresponding source directory. In this way, other application can be pointed to the appropriate output directory and can still access the source directory when necessary.

In accordance with one embodiment, the split directory feature can be provided through an abstraction in the server called a virtual JAR file. The virtual JAR file provides an abstraction over the two split directories. When a request is made to the JAR to retrieve e.g. a/b.jar, the virtual JAR checks the /source directory, then checks the /output directory.

Ant Tasks wlcompile wlcompile is the main build task which compiles the application's java files. wlcompile begins by analyzing all of the components and determining their type. It treats components as either EJBs, Web applications, or Java components. Java components are compiled first into the output directory/APP-INF/classes so they will be visible throughout the application. Next, wlcompile builds the EJBs and automatically includes the previously built java components in the compiler's classpath. This allows the EJB components to call the java components without requiring the user to manually edit their classpath. Finally the .java files in the webapp are compiled with the EJB components and java components in the compiler's classpath. This allows the Web Applications to refer to the EJB and application java classes without manually editing the classpath. The following example compiles the application with sources in /acme/myapp to output directory /build/myapp:

```
<wlcompile srcdir="/acme/myapp" destdir="/build/myapp" />
```

By default wlcompile builds the entire application. It is also possible to instruct wlcompile to build a single component. This is especially useful when developing large applications where the developer is making isolated changes and wants a faster build. When wlcompile builds a single component, it only rebuilds that component. wlcompile does not track dependencies between components so it will not rebuild any other components which depend on the rebuilt component. The following example builds only the AcmeEJB component:

```
<wlcompile srcdir="/acme/myapp" destdir="/build/myapp"
    includes="AcmeEJB" />
```

As shown in the example above, wlcompile automatically guesses the type of each component in the application. In general, this guessing works well, but in some cases, especially when components are incomplete, wlcompile cannot accurately determine the type.

The common case where wlcompile fails is when an EJB is being developed. Users will typically compile their java files first, get this working, and then write their deployment descriptors. wlcompile is unable to determine that this component is an EJB when it does not have descriptors yet. wlcompile allows users to specify a component's type in cases where the guessing is not correct. The following example builds only the AcmeEJB component and hardcodes it to be an EJB:

```
<wlcompile srcdir="/acme/myapp" destdir="/build/myapp">
    <component name="AcmeEJB" type="EJB" />
</wlcompile>
```

Exclude lists may also be specified, so as to build everything but a few portions of the application.

wldeploy

```
<wldeploy user="system" password="gumby1234"
    action="deploy" source="/build/myapp" />
``` wlpackage

The following examples package split-directory myapp as a traditional EAR file:

```
<wlpackage toFile="/acme/App.ear" srcdir="/acme/myapp"
    destdir="/build/myapp" />
<wlpackage toDir="/acme/explodedEar" srcdir="/acme/myapp"
    destdir="/build/myapp" />
```

Split Directory Recipes

Stand-Alone webapp

```
AcmeWeb/WEB-INF/web.xml
AcmeWeb/WEB-INF/weblogic.xml
AcmeWeb/WEB-INF/src/com/acme/web/MyServlet.java
AcmeWeb/login.jsp
AcmeWeb/graphics/logo.jpg
```

The webapp source is contained within a directory (AcmeWeb). As usual, the descriptors are in the WEB-INF directory. The WEB-INF/src directory is a place for java classes such as servlets which will be compiled to the WEB-INF/classes directory. JSP files, HTML, and other web files are contained under the directory root.

Stand-Alone ejbapp

```
AcmeEJB/META-INF/ejb-jar.xml
AcmeEJB/META-INF/weblogic-ejb-jar.xml
AcmeEJB/com/acme/ejb/MyLocal.java
AcmeEJB/com/acme/ejb/MyHome.java
AcmeEJB/com/acme/ejb/MyEJB.java
```

The ejbapp source is contained within a directory (AcmeEJB). As usual, the descriptors are in the META-INF directory. Any java files under the AcmeEJB root directory are compiled into the output directory.

Application with webapp and ejb

```
InventoryApp/META-INF/application.xml
InventoryApp/META-INF/weblogic-application.xml
InventoryApp/AcmeEJB/META-INF/ejb-jar.xml
InventoryApp/AcmeEJB/META-INF/weblogic-ejb-jar.xml
InventoryApp/AcmeEJB/com/acme/ejb/MyLocal.java
InventoryApp/AcmeEJB/com/acme/ejb/MyHome.java
InventoryApp/AcmeEJB/com/acme/ejb/MyEJB.java
InventoryApp/AcmeWeb/WEB-INF/web.xml
InventoryApp/AcmeWeb/WEB-INF/weblogic.xml
InventoryApp/AcmeWeb/WEB-INF/src/com/acme/web/MyServlet.java
InventoryApp/AcmeWeb/login.jsp
InventoryApp/AcmeWeb/graphics/logo.jpg
```

This example shows an Inventory application which is made up of an EJB (AcmeEJB) and a webapp (AcmeWeb). The application's descriptors are contained in the META-INF/directory as usual. The application components, AcmeEJB and AcmeWeb, are contained in directories directly under the InventoryApp.

Third-Party Jar Files

```
InventoryApp/APP-INF/lib/xmlparser.jar
InventoryApp/APP-INF/lib/customlib.jar
```

This example demonstrates how the Inventory Application can be extended to use third-party jar files. Third-party jar files are jar files that are packaged with the application, but are usually not the develoer's own code, and are not recompiled. For instance, XML parsers, logging implementations, and other utility jar files are common. These files may be placed in the APP-INF/lib/subdirectory. They will be visible throughout the application.

Java Utility Classes

```
InventoryApp/AcmeMainframe/com/acme/mainframe/Connect.java
InventoryApp/AcmeMainframe/com/acme/mainframe/Login.java
InventoryApp/AcmeDebug/com/acme/debug/Tracer.java
```

This example demonstrates how the Inventory Application can be extended to use java utility classes. Java Utility classes differ from third-party jars because the source files are part of the application and must be compiled. Java Utility classes are typically libraries used by application components such as EJBs or webapps. The build process compiles these files into the APP-INF/classes directory under the output directory. These classes are avaliable throughout the application.

EJB Using EJBGen

```
AcmeEJB/com/acme/ejb/MyEJB.ejb
AcmeEJB/com/acme/ejb/SupportingClass.java
```

The ejbapp source is contained within a directory (AcmeEJB). The EJBGen source file must have a .ejb extension. The build system runs EJBGen on this file creating the java sources and descriptors in the output directory. Any java files in the source directory will be compiled as usual to the output directory.

Virtual Path Mapping

In accordance with an embodiment of the invention, virtual path mapping of directories is provided to allow greater flexibility in using the split-source functionality. In an application server (for example, WebLogic Server), each of the deployment tools (for example, weblogic.Deployer, wldeploy, and the Administration Console) can support direct deployment from a split-source development directory. In this case, the developer need specify only the build directory when deploying the application to the server. In WebLogic Server, the server attempts to use all classes and resources available in the source directory for deploying the application. If a required resource is not available in the source directory, the server then looks in the application's build directory for that resource. For example, if a deployment descriptor is generated during the build process, rather than stored with source code as an editable file, then the server obtains the generated file from the build directory. The server discovers the location of the source directory by examining a .beabuild.txt file that resides in the top level of the application's build directory. If the developer moves or modifies the source directory location, they can edit the .beabuild.txt file to identify the new source directory name.

Figure 3:
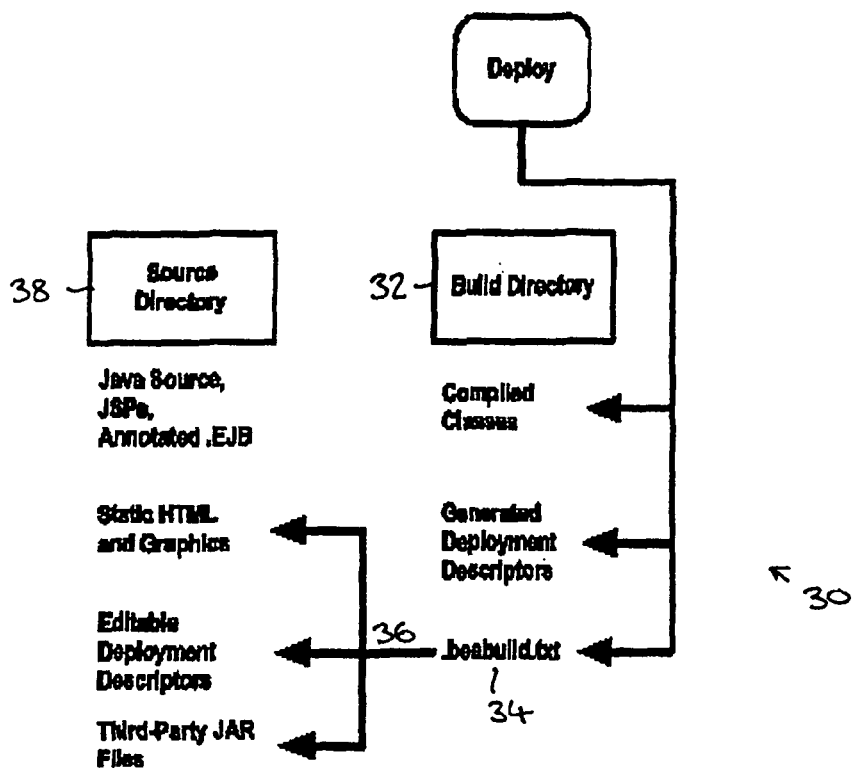
FIG. 3 shows an illustration of a split-source deployment in accordance with an embodiment of the invention.

FIG. 3 shows an illustration of a split-source deployment 30 in accordance with an embodiment of the invention. As shown in FIG. 3, The process is initiated by specifying the build directory with an appropriate server deployment tool. As shown in FIG. 3, all compiled classes and generated deployment descriptors are discovered in the build directory 32, but other application resources (such as static files and editable deployment descriptors) may be missing. The server uses the hidden .beabuild.txt file 34 to locate 36 the application's source directory 38, where it finds the required resources.

One of the problems with the standard split-source approach, is that it assumes that the source directory structure and the output directory structure will appear similar to the EAR structure. However, in some instances this is not the case. To allow for this, in accordance with an embodiment, the .beabuild.txt file is instead a list of path mappings from a physical location to a virtual one, relative to the location of the .beabuild.txt file. This provides greater flexibility in using the split-source functionality.

Figure 4:
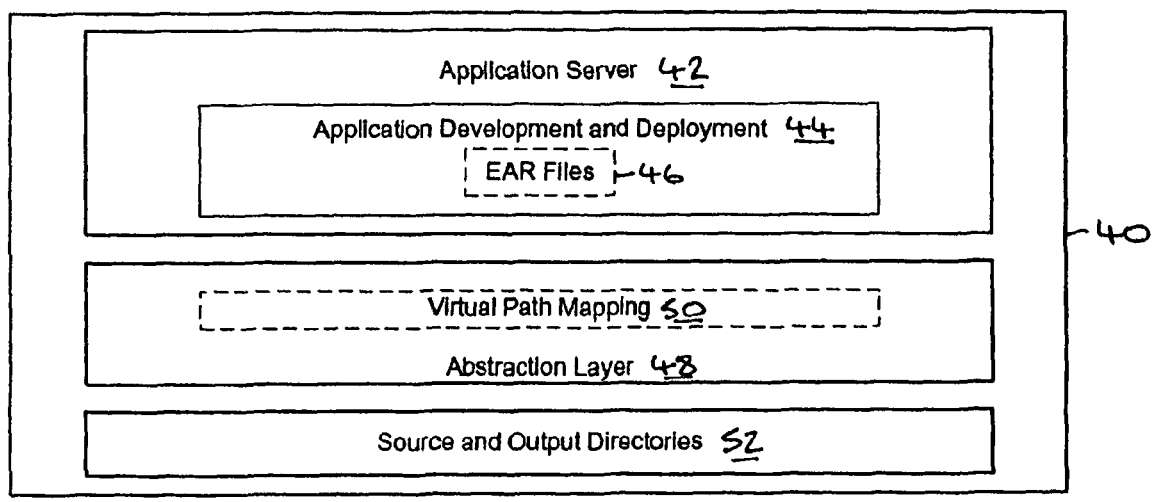
FIG. 4 shows an illustration of a system that uses a split-source directory structure and abstraction layer or virtual mappings in accordance with an embodiment of the invention.

FIG. 4 shows an illustration of a system 40 that uses a split-source directory structure and abstraction layer or virtual mappings in accordance with an embodiment of the invention. As shown in FIG. 4, an application server 42 includes an application development and deployment tool 44 for managing application EAR files 46. An abstraction layer 48 is provided to shield the server (or any other program that does not need to write to the virtual directory) from the actual details of how the virtual directory structure 50 is implemented. The virtual directory provides a mapping to the actual source and output directories 52, while the abstraction layer presents a standard read-only file system interface that is very similar to what an archived EAR must look like.

Since it is possible that multiple files with the same name will be mapped into the same location, the system also needs a path resolution strategy. In accordance with an embodiment, the resolution strategy provides that the physical location (i.e. where the .beabuild.txt file is located) always wins; after that, resolution is performed strictly by the ordering of the entries in the .beabuild.txt file.

The advantages of the virtual path mapping include that it supports an arbitrary number of locations; and can map a path into an arbitrary point in the Virtual Exploded EAR, not just the root. This allows that the build structure does not have to mirror the EAR structure. Both of these features allow the software greater flexibility in how the build structure is laid out.

The following is an example of a virtual path mapping in a MyApp application:

```
c:\oracle\lib\oracle123.jar = APP-INF\lib\oracle123.jar
c:\myapp\JavaProj\src = APP-INF\lib\JavaProj.jar
c:\myapp\JavaProj\classes = APP-INF\lib\JavaProj.jar
c:\myapp\WebApp\web = WebApp
c:\myapp\WebApp\classes = WebApp\WEB-INF\classes
c:\some\other\project\TraderEJB.jar = FooEJB.jar
```

The following is an example of the application.xml in the exploded EAR that these mappings could then be used for:

```
<module>
    <web>
        <web-uri>WebApp</web-uri>
        <context-root>WebApp</context-root>
    </web>
</module>
<module>
    <ejb>FooEJB.jar</ejb>
</module>
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for organization of files during a software development process, comprising:

a computer including a processor and storage medium;

a split directory structure stored on the computer, for use in deploying a software application, said split directory structure further comprising a source folder that stores source files for use with or as part of the software application, and a corresponding output folder that stores compiled versions of the source files for use with or as part of the software application, wherein the output folder is generated during the build process, and includes a build file which includes a list of path mappings from physical file locations to virtual file locations, and wherein the split directory is accessed as a virtual file that provides an abstraction over the source and output folders, so that the folders appear as a single application; and wherein subsequently, during deployment of the software application, the system determines the presence of the build file in the output folder, parses the list of path mappings included therein, maps virtual file locations specified in the source directory to physical file locations according to the path mappings, and deploys the application by making requests to the virtual file including retrieving source files and compiled versions of the sources files as required from the physical locations according to the path mappings.

2. The system of claim 1, wherein the directory structure required by the software application corresponds to an Enterprise Archive (EAR) file for that software application.

3. The system of claim 1, wherein, for each application, the virtual path mapping is specified in a build file for that application.

4. The system of claim 1, wherein the system further comprises an abstraction layer that provides a read-only file system interface similar to an archived EAR, to enable the system to access the split directory as specified by the virtual path mapping.

5. The system of claim 1, wherein the split directory is provided through a virtual JAR file that provides an abstraction over the source ant output folder, and wherein when a request is made to the virtual JAR to retrieve a resource, the virtual JAR first checks the source folder, and then checks the output folder, to locate the requested resource.

6. The system of claim 1, wherein the system uses a path resolution strategy to parse the list of path mappings included in the build files, including providing that the physical location where the build file is located always wins, and after that, resolution is performed according to the ordering of entries in the build file.

7. A method for organizing and using source and output files during a software development process, comprising the steps of:

providing a computer including a processor and storage medium;

providing a split directory structure stored on the computer, for use in deploying a software application, said split directory structure further comprising a source folder that stores source files for use with or as part of the software application, and a corresponding output folder that stores compiled versions of the source files for use with or as part of the software application, wherein the output folder is generated during the build process, and includes a build file which includes a list of path mappings from physical file locations to virtual file locations, and wherein the split directory is accessed as a virtual file that provides an abstraction over the source and output folders, so that the folders appear as a single application; and subsequently, during deployment of the software application, determining the presence of the build file in the output folder, parsing the list of path mappings included therein, mappings virtual file locations specified in the source directory to physical file locations according to the path mappings, and deploying the application by making requests to the virtual file including retrieving source files and compiled versions of the sources files as required from the physical locations according to the path mappings.

8. The method of claim 7, wherein the directory structure required by the software application corresponds to an Enterprise Archive (EAR) file for that software application.

9. The method of claim 8, wherein the abstraction layer provides a read-only file system interface similar to an archived EAR, to enable access the split directory as specified by the virtual path mapping.

10. The method of claim 7, wherein, for each application, the virtual path mapping is specified in a build file for that application.

11. The method of claim 7, wherein the split directory is provided through a virtual JAR file that provides an abstraction over the source ant output folder, and wherein when a request is made to the virtual JAR to retrieve a resource, the virtual JAR first checks the source folder, and then checks the output folder, to locate the requested resource.

12. The method of claim 7, including using a path resolution strategy to parse the list of path mappings included in the build files, including providing that the physical location where the build file is located always wins, and after that, resolution is performed according to the ordering of entries in the build file.

13. A computer readable medium including instructions stored thereon which when executed cause the computer to perform the steps of:

providing a split directory structure stored on the computer, for use in deploying a software application, said split directory structure further comprising a source folder that stores source files for use with or as part of the software application, and a corresponding output folder that stores compiled versions of the source files for use with or as part of the software application, wherein the output folder is generated during the build process, and includes a build file which includes a list of path mappings from physical file locations to virtual file locations, and wherein the split directory is accessed as a virtual file that provides an abstraction over the source and output folders, so that the folders appear as a single application; and subsequently, during deployment of the software application, determining the presence of the build file in the output folder, parsing the list of path mappings included therein, mappings virtual file locations specified in the source directory to physical file locations according to the path mappings, and deploying the application by making requests to the virtual file including retrieving source files and compiled versions of the sources files as required from the physical locations according to the path mappings.

14. The computer readable medium of claim 13, wherein the directory structure required by the software application corresponds to an EAR Enterprise Archive (EAR) file for that software application.

15. The computer readable medium of claim 13, wherein, for each application, the virtual path mapping is specified in a build file for that application.

16. The computer readable medium of claim 15, wherein the abstraction layer provides a read-only file system interface similar to an archived EAR, to enable access to this split directory as specified by the virtual path mapping.

17. The computer readable medium of claim 13, wherein the split directory is provided through a virtual JAR file that provides an abstraction over the source ant output folder, and wherein when a request is made to the virtual JAR to retrieve a resource, the virtual JAR first checks the source folder, and then checks the output folder, to locate the requested resource.

18. The computer readable medium of claim 13, including using a path resolution strategy to parse the list of path mappings included in the build files, including providing that the physical location where the build file is located always wins, and after that, resolution is performed according to the ordering of entries in the build file.

* * * * *

UNITED STATES PATENT AND TRADEMARK OFFICE
CERTIFICATE OF CORRECTION

| | | |
|---|---|---|
| PATENT NO. | : 7,774,754 B2 | |
| APPLICATION NO. | : 11/475769 | |
| DATED | : August 17, 2010 | |
| INVENTOR(S) | : Konstantin Komissarchik et al. | |

It is certified that error appears in the above-identified patent and that said Letters Patent is hereby corrected as shown below:

In column 6, line 14, delete "develoer's" and insert -- developer's --, therefor.

In column 6, line 35, delete "avaliable" and insert -- available --, therefor.

Signed and Sealed this
Seventeenth Day of May, 2011

David J. Kappos
*Director of the United States Patent and Trademark Office*